United States Patent Office 3,278,517
Patented Oct. 11, 1966

3,278,517
METHOD FOR RECOVERING NUCLEOTIDE AND THE SALTS THEREOF FROM FERMENTATION BROTH
Hirofuto Marumo, Shunichi Tatsumi, Yoshiki Tanaka, and Toshio Ikemoto, Shizuoka-ken, Japan, assignors to Kyowa Hakko Kogyo Co., Ltd., Tokyo, Japan, a corporation of Japan
No Drawing. Filed May 13, 1964, Ser. No. 367,231
Claims priority, application Japan, May 15, 1963, 38/24,172
7 Claims. (Cl. 260—211.5)

The present invention relates to a method for recovering nucleotides and the salts thereof from fermentation broth, and more particularly relates to a method for recovering nucleotides such as inosinic acid, guanylic acid and xanthylic acid from fermentation broth by using an ion-exchange system consisting of cation exchange resin and anion exchange resin or a system consisting of anion exchange resin, cation exchange resin and anion exchange resin.

In recent years, the process for producing nucleotide by fermentation has been developed and the above-mentioned nucleotides are produced in the culture medium; however, the problem is how to recover the produced nucleotides commercially. Some studies have been made on the isolation and separation of purine bases and nucleotides obtained from yeast nucleic acid (Science 109, 377, 1949). The report teaches the fractionating separation of uridylic acid, guanylic acid, cytidylic acid and adenylic acid by using cation exchange resin; however, it teaches only the separation of nucleotides from each other and some improvements are needed for applying the so-called resin process in commercially recovering nucleotides from fermentation broth.

One object of the present invention is to provide a commercial method for recovering nucleotide from fermentation broth, and other objects are easily understood from the description which follows.

According to the present invention, fermented broth is passed through strongly acidic cation exchange resin and nucleotide is adsorbed loosely on the resin. The adsorbed nucleotide is then eluted with water. The eluate is passed through strongly basic anion exchange resin on which nucleotide is adsorbed. The adsorbed nucleotide is then eluted with mineral acid such as HCl and the like and the eluate is neutralized with alkali and concentrated, whereupon alkali salt of nucleotide is obtained. In the present process, nucleotide is favourably concentrated by treating with only a small amount of anion exchange resin; moreover, not only the refining effect of the present process is very great but also the yield of nucleotide is very high. When the broth contains a large amount of solid materials or contains materials having the property of coagulating during the treatment such as protein, the broth is filtered or heated and then filtered, and the filtrate is treated as above mentioned.

The phosphoric acid part of nucleotides combines with anion exchange resin, on the contrary in acidic solution, the dissociation of the phosphoric acid part of nucleotide is prevented and the base part combines with cation exchange resin. Therefore, the nucleotides can be adsorbed on both cation and anion exchange resins by controlling the acidity of the solution.

In the case of the nucleotide fermentation broth, it contains salts which are decomposed to give acid by contacting with cation exchange resin; thus the nucleotide can be adsorbed on cation exchange resin. However, the affinity between nucleotide and cation exchange resin is not so strong so that the adsorbed nucleotide is eluted with water. In eluting the adsorbed nucleotide with water, the fraction of nucleotide and that of impurity such as coloring materials, organic and inorganic acids are chromatographically separated from each other, and the nucleotide is considerably refined.

As the strongly acidic cation exchange resin in the present invention, polystyrene sulfonic acid type resin such as Amberlite IR–120 (available from Rohm & Haas Co., U.S.A.) and Diaion SK#1A (available from Mitsubishi Chem. Co., Japan) is preferably used in its H-form.

The nucleotide-containing eluate from cation exchange resin is then passed through anion exchange resin (OH-form) and the adsorbed nucleotide is eluted by mineral acid such as hydrochloric acid and sulfuric acid. By this treatment, the nucleotide is considerably refined and concentrated.

As the strongly basic anion exchange resin in the above treatment, polystyrene type resin such as Amberlite IRA–411 (available from Rohm & Haas Co., U.S.A.) and Diaion SA#21A (available from Mitsubishi Chem. Co., Japan) is preferably used.

When the concentration of the produced nucleotide in the fermentation broth is not so high, the broth filtrate is favourably treated by strongly basic anion exchange resin as above described, and the eluate is then treated by using the system of cation-anion exchange resin.

The finally obtained nucleotide-containing eluate is neutralized by adding alkali and is concentrated whereupon the alkali salt of nucleotide is obtained.

The method of the present invention is much more profitable commercially than the evaporation process. The following examples further assist in understanding the present invention more in detail; but they are not intended is limitation of the present invention.

*Example 1*

The fermented broth of *Micrococcus glutamicus* ATCC 14305 was adjusted to pH 6.0, and then was heated and filtered to remove microbial cell and other solid matters. 95 liters of the filtrate containing 74.4 g. of inosinic acid as sodium salt was passed through a column packed with 100 liters of H-form of Diaion SK#1A. 125 liters of the inosinic acid-containing fraction was eluted with water, and then passed through a column packed with 620 ml. of OH-form of Diaion SA#21A. The adsorbed inosinic acid was eluted with 0.3 N hydrochloric acid. 1.2 liters of inosinic acid-containing eluate was obtained in a yield of 98.7%, neutralized with NaOH, and concentrated to 200 ml. under reduced pressure at 50° C. The concentrate was cooled to 5° C. and sodium inosinate was crystallized. 55.1 g. of sodium inosinate (purity 94.3%) was obtained.

*Example 2*

30 liters of the same broth as described in Example 1 containing 42.0 g. of inosinic acid calculated as sodium salt was used. The pH of the filtrate was adjusted to 9.0 by adding sodium hydroxide, then the filtrate was passed through a column packed with 15 liters of OH-form of Diaion SA#21A. After washing with water, the adsorbed inosinic acid was eluted with 0.3 N HCl, and 18 liters of inosinic acid-containing eluate was obtained. The eluate was then passed through a column packed with 20 liters of H-form of Diaion SK#1A. 25 liters of inosinic acid-containing eluate was obtained by water-elution. The eluate was then passed through a column packed with 250 ml. of OH-form of Diaion SA#21A and the inosinic acid was adsorbed. The adsorbed inosinic acid was eluted with 0.3 N HCl. 500 ml. of eluate was obtained. The yield was 97.0%. The eluate was neutralized with NaOH and concentrated under reduced pressure at 50° C. to 100 ml., and cooled to 5° C., 29.4 g. of needle white crystals of sodium inosinate (purity 97.7%) was obtained.

Example 3

5 liters of the fermented broth filtrate of *Brevibacterium ammoniagenes* ATCC 6871 containing 10.12 g. of guanylic acid calculated as sodium salt was passed through 5 liters of H-form of Diaion SK#1A. 10 liters of guanylic acid-containing fraction was obtained by water-elution. The eluate was then passed through 100 ml. of OH-form of Diaion SA#21A. Eluting with 0.5 N HCl, 150 ml. of the eluate containing guanylic acid was obtained. The eluate was neutralized with NaOH, concentrated at 50° C. in vacuo to 30 ml., and cooled. 7.2 g. of guanylic acid sodium salt was obtained and the purity was 93.1%.

What we claim is:

1. A method for recovering nucleotide from fermentation broth which comprises passing the broth through polystyrene type strongly acidic cation exchange resin, eluting the adsorbed nucleotide with water, passing the eluate through polystyrene type strongly basic anion exchange resin, eluting the adsorbed nucleotide with mineral acid selected from the group consisting of hydrochloric acid and sulfuric acid, and recovering the thus-eluted nucleotide.

2. A method for recovering nucleotide from fermentation broth which comprises filtering the broth, passing the filtrate through polystyrene type strongly acidic cation exchange resin, eluting the adsorbed nucleotide with water, passing the eluate through polystyrene type strongly basic anion exchange resin, eluting the adsorbed nucleotide with mineral acid selected from the group consisting of hydrochloric acid and sulfuric acid, and recovering the thus-eluted nucleotide.

3. A method for recovering nucleotide from fermentation broth which comprises passing the broth through polystyrene type strongly basic anion exchange resin, eluting the adsorbed nucleotide with mineral acid selected from the group consisting of hydrochloric acid and sulfuric acid, passing the eluate through polystyrene type strongly acidic cation exchange resin, eluting the adsorbed nucleotide with water, passing the eluate through polystyrene type strongly basic anion exchange resin, eluting the adsorbed nucleotide with mineral acid selected from the group consisting of hydrochloric acid and sulfuric acid, and recovering the thus-eluted nucleotide.

4. A method for recovering nucleotide from fermentation broth which comprises filtering the broth, passing the filtrate through polystyrene type strongly basic anion exchange resin, eluting the adsorbed nucleotide with mineral acid selected from the group consisting of hydrochloric acid and sulfuric acid, passing the eluate through polystyrene type strongly acidic cation exchange resin, eluting the adsorbed nucleotide with water, passing the eluate through polystyrene type strongly basic anion exchange resin, eluting the adsorbed nucleotide with mineral acid selected from the group consisting of hydrochloric acid and sulfuric acid, and recovering the thus-eluted nucleotide.

5. A method according to claim 1, wherein the nucleotide is inosinic acid.

6. A method according to claim 3, wherein the nucleotide is inosinic acid.

7. A method according to claim 2, wherein the nucleotide is guanylic acid.

References Cited by the Examiner

UNITED STATES PATENTS

| | | | |
|---|---|---|---|
| 2,671,059 | 3/1954 | Smit | 260—211.5 |
| 2,891,945 | 6/1959 | Stark | 260—211.5 |

FOREIGN PATENTS

| | | |
|---|---|---|
| 930,428 | 6/1963 | Great Britain. |

LEWIS GOTTS, *Primary Examiner.*

JOHNNIE R. BROWN, *Assistant Examiner.*